United States Patent [19]
Bohannon

[11] Patent Number: 5,137,484
[45] Date of Patent: Aug. 11, 1992

[54] METHOD OF MAKING A LIQUID CRYSTAL DISPLAY CONSTRUCTION

[75] Inventor: William K. Bohannon, San Diego, Calif.

[73] Assignee: Proxima Corporation, San Diego, Calif.

[21] Appl. No.: 714,439

[22] Filed: Jun. 13, 1991

[51] Int. Cl.$^5$ .............................. G02F 1/133
[52] U.S. Cl. ........................ 445/25; 141/7; 141/82; 359/53; 359/80
[58] Field of Search ............... 445/25; 141/7, 82; 359/53, 63, 64, 74, 80

[56] References Cited

U.S. PATENT DOCUMENTS

| | | | |
|---|---|---|---|
| 4,091,847 | 5/1978 | Sorkin | 141/7 |
| 4,922,972 | 5/1990 | Watanabe | 141/7 X |
| 5,029,985 | 7/1991 | Suzuki et al. | 359/53 |
| 5,071,231 | 12/1991 | Armitage et al. | 359/53 |

Primary Examiner—Kenneth J. Ramsey
Attorney, Agent, or Firm—Bernard L. Kleinke; Jerry R. Potts; William P. Waters

[57] ABSTRACT

A method of making a LCD panel system including selecting a pair of substrate panels, forming a peripheral seal on one of the flat surfaces of one of the panels to define an area on the panel surface, distributing compressible optical spheres over the area, aligning one substrate panel with the first and placing the second panel against the seal, in an aligned condition with the other to form a chamber. The panels are pressed together to form a fluid tight seal between the panels. Air is then evacuated from the chamber and an optical fluid is introduced into the chamber.

15 Claims, 2 Drawing Sheets

METHOD OF MAKING A LIQUID CRYSTAL DISPLAY CONSTRUCTION

CROSS-REFERENCE TO RELATED APPLICATIONS

This application relates to a copending patent application Ser. No. 714,440, filed Jun. 13, 1991, entitled "LIQUID CRYSTAL DISPLAY CONSTRUCTION AND METHOD OF USING SAME," which is hereby incorporated by reference as if fully set forth herein.

DESCRIPTION

1. Technical Field

The present invention relates generally to a method of making a liquid crystal display panel construction having improved optical characteristics.

2. Background Art

The above referenced related patent application discloses a liquid crystal display panel construction, including a layer of ordered optical fluid, for improving the optical characteristics of the panel construction. The fluid is disposed in a fluid tight chamber within the panel construction. A plurality of optically clear, compressible, optical spheres are disposed within the chamber and thus are embedded within the fluid, to help serve as spacers to maintain the chamber in a spaced apart relationship uniformly.

The chamber is filled with the ordered fluid in order to aid in the accomplishment of improved LCD panel system performance, and it is very important that the air chamber be completely filled by the ordered fluid and that no air bubbles are present. Such bubbles could provide unwanted optical loss or aberrations. In addition, a suitable means of sealing the chamber must be provided in order to maintain system integrity, proper optical coupling, and to prevent leakage of the fluid from the system.

However, there is a problem in filling the chamber properly with the optical fluid, in the form of a viscous gel, in order for the system to achieve the desired improved optical coupling and reduced refraction, reflection and light losses. In this regard, the thick, viscous gel must be applied in a thin, uniform manner over the entire surface to be coated without any bubbles, in a mass production mode of manufacturing.

The problem of filling completely the chamber is made even more perplexing by virtue of the fact that the more suitable gels for some applications, are very viscous, and thus do not flow readily.

Thus, it is difficult to get the gel to flow in a desired manner uniformly, without the introduction of the unwanted bubbles. As a result, the requirement for filling the chamber with the gel becomes difficult, if not impossible, to achieve.

Therefore, it would be highly desirable to have a method of making an improved LCD panel construction, which would provide a fluid tight chamber, filled completely with an optical fluid, such as a viscous gel, and free of any unwanted elements, such as air bubbles.

In addition to the above mentioned limitations in conventional LCD system construction methods, the details of the internal chamber itself deserve consideration. The inventive system utilizes conventional glass substrate panels to form the top and bottom of the chamber. These panels are very thin, having a thickness on the order of 0.5-1.2 mm. Thus, the panels may well be unable to provide adequate support uniformly over the area of the chamber, because of the fragility of the panels. Thus, the optical spheres are important to serve as spacers. However, the tiny, light weight spheres must be uniformly distributed over the area of the chamber, and distributed through the optical fluid. Such added requirement makes the construction even more difficult, if not impossible to accomplish.

DISCLOSURE OF INVENTION

It is an object of the present invention to provide a new and improved method of making a liquid crystal display panel construction employing a viscous optical fluid, wherein the fluid is admitted to the other components of the construction in a uniform, desired manner.

It is a further object of the present invention to provide such a new and improved method, wherein the optical fluid is admitted free of unwanted elements such as air bubbles, with minuscule optical spheres embedded uniformly through the fluid.

It is a still further object of the present invention to provide such a method for enclosing the optical fluid within a chamber of the display panel construction in a fluid tight manner.

Briefly, the above and further objects are realized by providing a method of making a liquid crystal display panel construction by applying a vacuum to a chamber of the construction, and to admit a viscous optical fluid to the chamber for causing the fluid to flow therein in a uniform manner. If desired, optical spheres can be initially distributed throughout the chamber, and clamped in place therewithin to fix them in position as the fluid flows into the chamber.

The present invention affords several advantages. For example, the chamber can be evacuated at the same time the optical fluid is being introduced into it, thereby insuring an even distribution of fluid throughout the chamber, and the elimination of air bubbles from the chamber.

In addition, the use of compressible optical spheres, when required, provides structural support at a great number of points, for the components forming the thin chamber.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
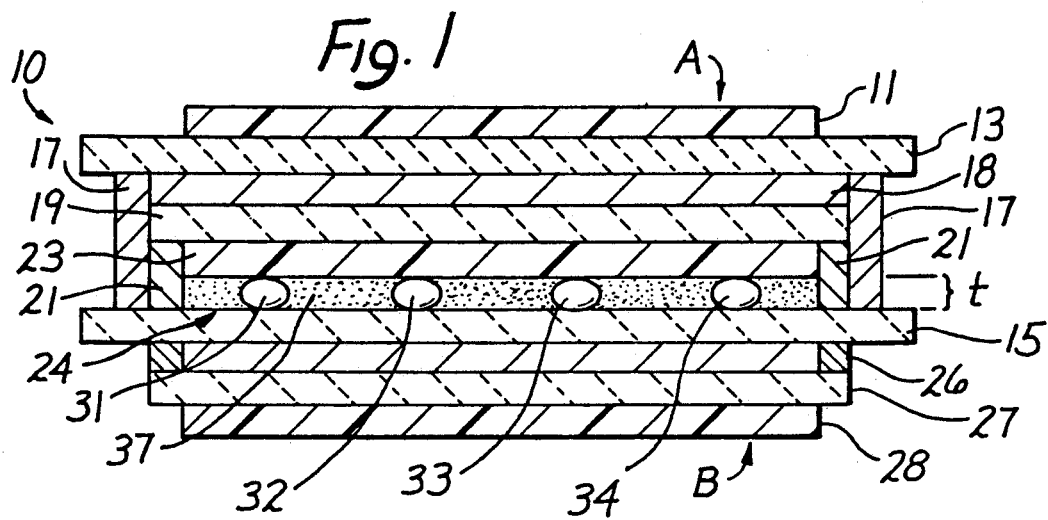
FIG. 1 is a diagrammatic view of a stacked liquid crystal display panel construction, according to the present invention.

Referring to the drawings, and more particularly to FIG. 1 thereof, there is shown a stacked liquid crystal display panel construction 10 of the present invention. The construction 10 includes a pair of liquid crystal display panels A and B. Liquid display panel A includes a polarizer 11, a protective glass substrate plate 13, a layer of liquid crystal material 18 in the form of a matrix of liquid crystal pixel elements, and another protective glass substrate plate 19.

The liquid crystal display panel B includes a protective glass substrate plate 15, a layer of liquid crystal display material 26 in the form of a matrix of liquid crystal pixel elements, another protective glass substrate plate 27 and a polarizer 28. The polarizers, such as the polarizers 11 and 28 are generally mylar sheets which are laminated on the exterior surfaces of the glass substrate panels 11 and 28.

The LCD panels are each assembled and function in a conventional manner. Also, the polarizers are conventional, and function with the LCD panels in a known manner. The panels and polarizers are generally rectangular in shape, and are thin and flat in their configuration, as is well known in the art.

The liquid crystal display panels A and B are fixedly joined together by a peripheral seal 17, which is composed of a suitable elastomeric material. The seal 17 extends between the glass plates 13 and 15, which are substantially larger than the other parts of their respective panels. A spacer 21, extending peripherally adjacent to the seal 17 composed of suitable opaque material, is interposed between the glass substrate plate 19 of panel A and the glass substrate plate 15 of panel B to maintain the panels in a spaced apart relationship. A polarizer 23 is attached to the inner surface of the glass substrate plate 19 and is surrounded peripherally by the spacer 21. The polarizer 23 and the glass substrate plate 15, together with the spacer 21, define a thin, generally rectangular chamber 24.

In addition to the seal 17, a peripheral seal 12 is disposed between the plate 19 and the plate 13 to join the seals and to confine the liquid crystal material 18. Another peripheral seal 22 is disposed between the plate 15 and the plate 27 to join the plate and to confine the liquid crystal material 26. The seals 12 and 22 are similar in composition to the seal 17.

If it is desired to maintain accurate spacing within the chamber, optical spheres, such as the spheres 31, 32, 33 and 34 are disposed randomly within the chamber 24 to maintain uniform spacing between the plates 23 and 15. In accordance with the present invention, an optical fluid in the form of a clear viscous gel material 37, having suitable optical transmissivity characteristics, is disposed within the chamber 24 with the spheres 31, 32, 33 and 34 being impeded therewithin. The gel 37 substantially fills the chamber 24 to form a layer which extends in a parallel, spaced-apart manner relative to the two matrices of liquid crystal elements of the panels A and B to serve as an optical joint to eliminate, or to reduce greatly unwanted light reflections, refractions, or other losses.

The optical spheres, such as the spheres 31, 32, 33 and 34, when disposed within the chamber 24, hold the panels A and B in a predetermined, spaced apart relationship. A plurality of spheres are utilized, and they are distributed randomly in a monolayer, throughout the chamber 24.

The optical spheres are slightly deformable and compressible, each having a diameter which is slightly greater than a desired height t of the chamber 24. In assembling the construction 10, a bead diameter slightly larger than the height t of the chamber 24 is selected so that, when the panels A and B are pressed together during assembly of the system 10 as more fully described in the above referenced copending application, the spheres assume a generally ovoid or flattened shape when they become deformed between the panels A and B. Of course, after assembling the construction, the glass substrates, such as the glass plates 23 and 15, fix the spheres in position by virtue of compression of the spheres by the glass substrates.

Thus, the optical spheres become fixed in a random monolayer distribution within the chamber 24 where they support the system 10 components and aid in maintaining the desired height t of the chamber 24.

In addition to their support and separating functions, the spheres are capable of responding, with the liquid crystal material, to thickness changes resulting from temperature variations.

In one form of the invention, the spheres, in their unstressed condition, are essentially perfectly spherical particles composed of cross linked polymers, principally divinyl benzene, having a specific gravity and thermal expansion coefficient close to that of the optical gel material. A suitable bead is marketed under the trademark MICROPEARL SP. This bead is manufactured by Sekisui Fine Chemical Co. of Japan.

In addition to the spacing and supporting functions described above, the spheres aid in correcting any unevenness of glass substrate surfaces, while maintaining the microscopic uniformity of the liquid crystal layer. The spheres are substantially invisible due to their transparency, and have similar optical transmissivity characteristics to the glass substrates.

In this regard, the optical gel 37 has an index of refraction, which is substantially equal to the index of refraction of the inner surfaces of the stacked and joined panels A and B, the spheres and the polarizers 11 and 28.

If the desired optical characteristics of the construction 10 so require, the gel 37 can be an ordered fluid having anisotropic properties, such as birefringence. In some applications, the gel may be treated to accept an appropriate dichroic dye, thereby imparting dichroic polarizing capabilities to the gel 37 and eliminating the need for a dichroic filter in the construction 10. Thus, the gel has a broad capability for allowing the designer of the construction 10 to change or augment the total birefringence of the construction 10 by adding additional birefringence by modifying the birefringent optical characteristics of the gel 37. Thus, the augmented birefringent characteristics can be utilized to optimize, or at least to improve greatly the function of the combined panels A and B, by matching the optical characteristics of the gel 37 to the specific desired wavelength of light being transmitted. Hence, the gel has significant utility for stacked LCD display systems.

In addition, the birefringence of the gel 37 can be used to change the elliptical nature of polarized light leaving an LCD panel due to the birefringent nature thereof. This characteristic can be used to eliminate unwanted color components, as well as increasing the overall contrast and transmissivity of the LCD panels.

The surface preparation methods depend upon the optical characteristics of the optical coupling gel. If a gel with isotropic optical properties, either in the index of refraction or spectral absorption, is selected, then the surface must be clean and flat to normal tolerances, within the chamber 24. If the gel is chosen to contain anisotropic optical properties such as birefringence or dichroic dyes, then the inner surfaces of the chamber 24 must be prepared to insure that the optical gel molecules align properly to enable the desired use of the optical anisotrophy. This alignment feature can be achieved by either a light chemical etch, or other reaction, or through the use of an additional printed-on polymer alignment layer, similar to that used in conventional LCD manufacturing techniques. Additionally, the outer surface of any necessary polarizers can be used as an alignment layer with a light rubbing technique.

The seal 21 for the optical gel is formed by printing or silk screening on a seal pattern to one or both of the inner surfaces of the chamber of the LCD panels A and B.

In connection with the spacing of the chamber 24, depending upon the type of optical anisotrophies in the optical coupling fluid, the spacing between the LCD panels is somewhat critical. If an optical coupling gel with a very small birefringence is selected, than any normal variations in the coupling chamber does not affect the overall performance, since the optical retardation is the product of the birefringence and the chamber dimension t, with the variations being a small percentage of the chamber dimension t. However, if an optical gel is chosen with a relatively large birefringence, then the dimension t must be small and the variations must be small to prevent nay uneven color variations caused by excessive changes in the overall optical retardation. To maintain the chamber variation in the case where large birefringence gels are employed, the spherical spacers help maintain the desired critical dimension t.

A number of commercially available gels are suitable. For example, gels designated as ZLT-3126, ZLT-2666 and ZLT-2804, manufactured by E. Merck Darmstadt are satisfactory. Some of the characteristics of the three gels are depicted in the following Table 1.

TABLE 1

| MIXTURE: | ZLI-3126 | ZLI-2666 | ZLI-2806 |
|---|---|---|---|
| S-N (°C.) | −7 | <−20 | <−30 |
| Clearing point (°C.) | +63 | +70 | +100 |
| Viscosity (mm$^2$s$^{-1}$) 20° C. | 20 | 45 | 87 |
| Viscosity (mm$^2$s$^{-1}$) 0° C. | 62 | 153 | 200 |
| Viscosity (mm$^2$s$^{-1}$) −20° C. | — | 830 | 1170 |
| Viscosity (mm$^2$s$^{-1}$) −30° C. | — | — | 3700 |
| Viscosity (mm$^2$s$^{-1}$) −40° C. | — | — | cryst. |
| K$_3$/K$_1$ +20° C. | 1.21 | — | — |
| K$_3$/K$_2$ +20° C. | 2.3 | — | — |
| V$_{(10,0.20)}$ | 2.74 | DAP 1.7 | DAP 1.9 |
| V$_{(80,0.20)}$ | 3.24 | — | — |
| V$_{(90,0.20)}$ | 4.04 | — | — |
| Temp. dep. (mv/°C.) (0–40° C.) | 22.4 | — | — |
| Temp. dep. (%/°C.) (0–40° C.) | 0.81 | — | — |
| (V$_{60}$/V$_{10}$−1) 100 (%) | 18.8 | — | — |
| (V$_{90}$/V$_{10}$−1) 100 (%) | 47.7 | — | — |
| M20 | 1.77 | — | — |
| M0–40 | 2.38 | — | — |
| M0–40 | 1.77 | — | — |

In addition to the gels discussed above, other gels, such as UV11-3, UV11-4M1, UV11-5, UV14, UV14-1, UV14-3 and UV15-7 manufactured by Master Bond, Inc. of Hackensak, New Jersey, are suitable. These gels are viscous and optically clear. In addition, they are good adhesives. Thus, the gels aid in bonding the panels A and B together. Typical properties of the UV15-7 gel are listed in Table 2.

TABLE 2

| | |
|---|---|
| Color, uncured compound, 25° C. | colorless transparent |
| Viscosity, uncured compound, cps, 25° C. | 6,000–10,000 |
| Specific gravity, 25° C. | 1.20 |
| Non-volatile content, % | 100 |
| Hardness, Shore D, 25° C. | >50 |
| Tensile strength, psi, 25° C. | 2830 |
| Elongation, %, 25° C. | 10–15% |
| Thermal expansion coefficient/°C. | 18-10$^{-5}$ |
| Specific resistance, ohm-cm, 25° C. | 1 × 10$^{16}$ |
| Refractive Index | 1.47 |

The foregoing mentioned optical fluids are ordered fluids. A non-ordered optical fluid may also be employed. In this regard, NYOGEL OC-431A marketed by William F. Nye, Inc., of New Bedford, Mass., is a suitable non-ordered optical fluid.

NYOGEL OC-431A optical fluid is a crystal clear, gel-like, optical coupling compound. The presence of air at the junction of the two LCD panels A and B tends to cause significant light refraction due to the large differential optical impedance that exists between air and the panels. Optical coupling fluid OC-431A is formulated with the requisite optical properties of clarity, purity, and refractive index to minimize optical losses.

The following is a Table 3, illustrating the properties of NYOGEL OC-431A, as follows:

TABLE 3

| | |
|---|---|
| Color | Crystal Clear |
| Appearance | Smooth, Transparent |
| Refractive Index at 25° C., Sodium D line, 5893Å | 1.463 |
| dN$_D$/dt (−40 to 80° C.) | −0.0003/°C. |
| Dispersion N$_F$-N$_c$ (Hydrogen F Line = 486.1 nanometers; Hydrogen C Line = 656.3 nanometers) | <0.012 |
| Consistency. Unworked Penetration per ASTM D-1403, ¼ Scale | 235 to 265 (Converted to full scale penetration) |
| Oil Separation, 24 hrs at 100° C. | None |
| Evaporation, 24 hrs at 100° C. | 2.8% |
| Dropping Point (Melting Point) | None |
| Specific Gravity at 25° C. | 1.06 |
| Pour Point of Base Oil | −62° C. |
| Viscosity of Base Oil at −29° C. | 23,684 cs |
| Thermal Coefficient of Expansion | 0.0006 cc/cc/°C. |
| Apparent Viscosity as a function of Temperature: Conditions: Brookfield Viscometer Model HBT-2X, 1 RPM, T-A Spindle. | |
| Degrees Centigrade | Poises |
| −40 | 44,373 |
| −20 | 23,360 |
| 0 | 20,576 |
| 25 | 14,880 |
| 40 | 10,656 |
| 80 | 8,160 |

In constructing the LCD panel system of the present invention, standard LCD components are selected, and prepared in order to have a leak tight seal between the LCD components in a stack. The fluid tight volume formed when two LCD panels are joined is then filled with an optical gel having the desired optical properties. Two or more LCD panels can be joined in this fashion, with thin optical gel volumes uniformly disposed between the panels.

In selecting the optical gel for use in the system 10, it is important to select a gel having a index of refraction that reasonably matches the index of refraction of the inner surfaces of the LCD panels, including any polarizers. When such matching is accomplished, optical coupling is achieved, thereby allowing the optimum light transmissivity through the stacked LCD panel system.

In addition to the optical gel qualities discussed above, the optical gel can have other optical properties for a particular design of a stacked LCD system. These additional properties may be optical and anisotropic and spectral filtering, with either isotropic dyes or dichroic dyes. The addition of optical and isotropic dyes to the optical coupling gel allows the system designer to change or augment the total birefringence of the LCD system with additional birefringence from the optical coupling gel and path length (coupling thickness). This augmented birefringence can be used to optimize performance for the specific wavelength of light selected for transmission through the system. For example, stacked systems have been constructed to switch in successive stages through the following colors: red, green and blue.

In addition to the foregoing, the birefringence of the optical gel can be utilized to change the generally elliptical nature of polarized light leaving the LCD panel. This characteristic can be used to eliminate any unwanted color due to birefringence of the LCD panel, as well as increasing the panel's overall contrast and transmissivity.

Figure 4:
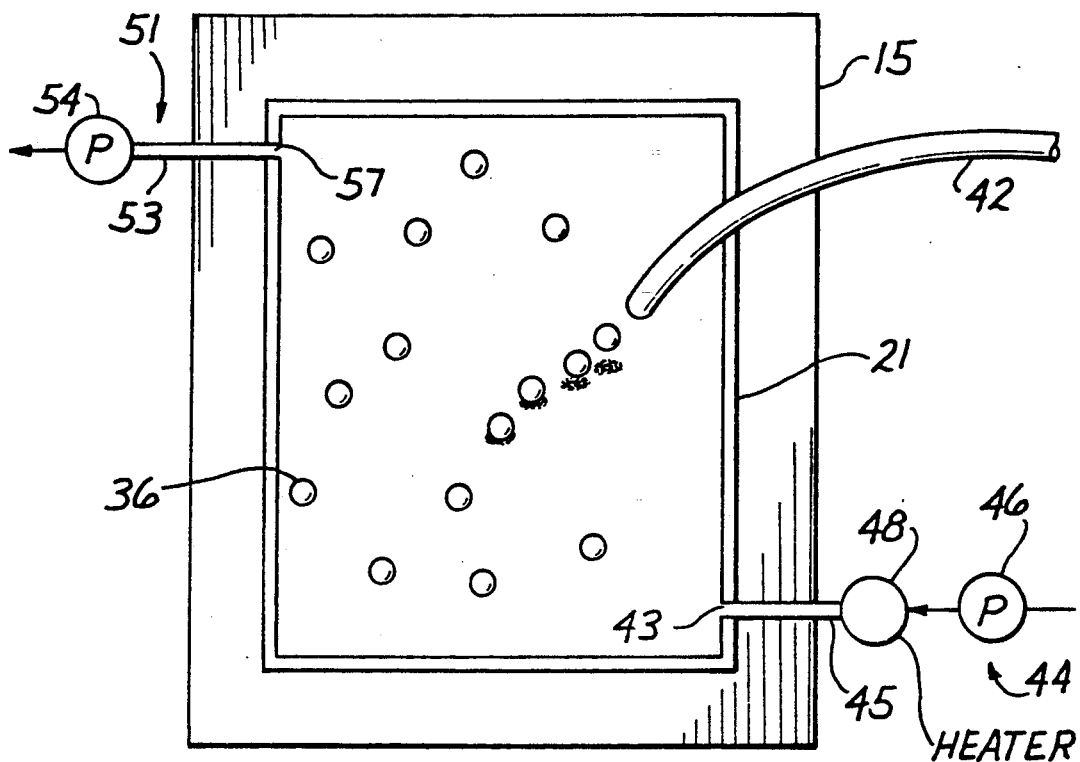
FIG. 4 is a diagrammatic view illustrating the panel construction of FIG. 1 in the process of being constructed according to the method of the present invention.
Figure 5:
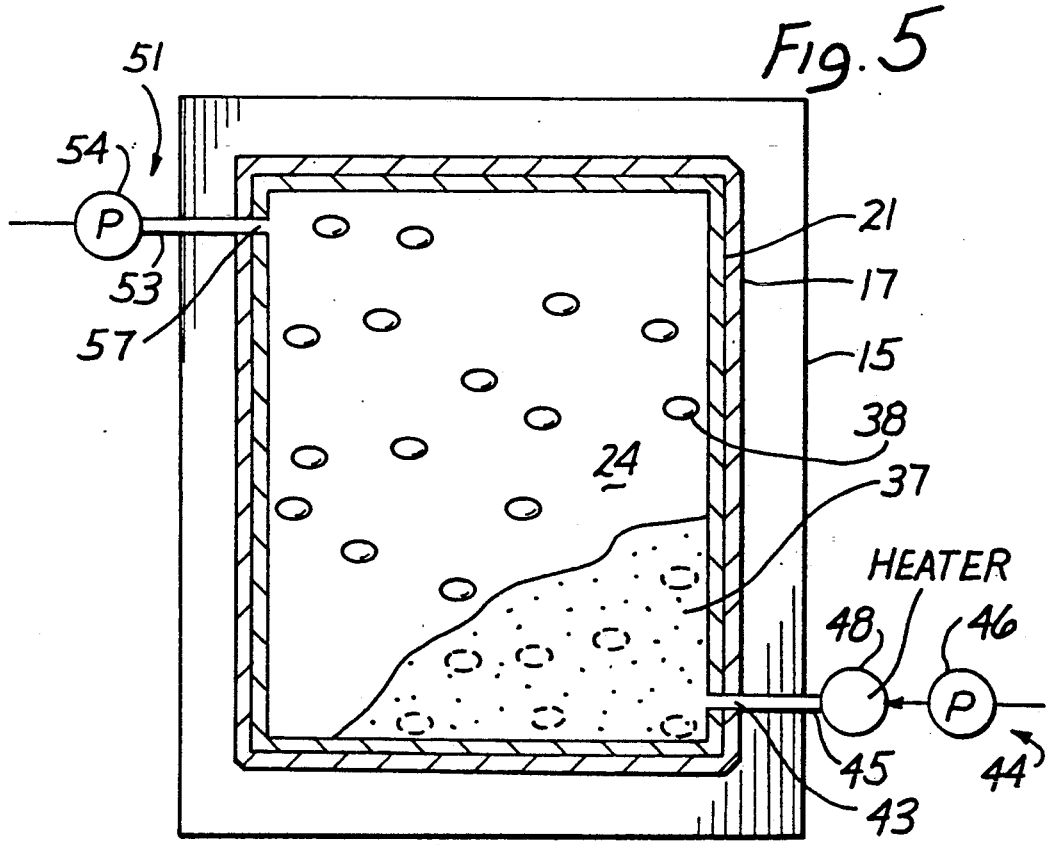
FIG. 5 is a diagrammatic view illustrating the panel construction of FIG. 1 in a further state of completion according to the present invention.

Considering now the method of making the construction of the system 10, with reference to FIGS. 4 and 5, an initial determination must first be made of the system optical requirements. Following this, system components, such as glass substrate plates and polarizers, are selected. In some instances, depending on system requirements, such as the optical characteristics of the system and the optical gel selected, preparatory steps must be made. Such steps include preparation of the glass plates, prior to the construction of the construction 10. For example, if a gel with isotropic optical properties, either in the index of refraction or spectral absorption, is selected, the substrate glass surface must be clean and flat to normal tolerances. If, on the other hand, the optical gel is selected to contain anisotropic optical properties, such as birefringence or dichroic dyes, the contacting surfaces of the glass plates must be carefully prepared to enable the optical gel molecules to align properly, thereby achieving the desired use of the anisotropic optical properties.

This alignment characteristic can be achieved by chemically etching the glass plates or by using an additional conventional printed on polymer alignment layer (not shown). In addition, the inner surface of the glass plates and, the outer surface of any polarizers, can be used as alignment layers after their surfaces have been treated by a conventional rubbing process.

With reference now to FIG. 4, there is depicted the construction 10 of FIG. 1 in the process of being assembled according to the method of the present invention. In this regard, the optical spheres, such as the sphere 36, are being introduced to the chamber 24.

In order to accomplish the filling of the chamber 24 with both the spheres and the optical gel, the construction 10 is assembled in two parts, which are later joined at the chamber. In this regard, the lower portion only of the construction 10 is illustrated in FIG. 4. The lower portion includes the panel B, with the spacer 21 disposed on the outer surface of the glass plate 15.

The seal 17 is composed of a suitable material to form a fluid tight bond between the glass plates. The seal 17 may be a suitable elastomeric material, or a suitable epoxy.

The spacer 21 has a thickness equal to the desired thickness t of the chamber 24.

The spacer 21 is fixed to the surface of the glass plate 15 by any suitable technique, such as applying an adhesive, to define thereby the side walls and bottom of the resulting chamber 24 (FIGS. 1 and 5).

The next step in the construction of the construction 10 is to attach an evacuation system 51 to an opening 57 at one corner of the rectangular spacer 21, and a fluid introducing system 44 through an opening 43 at an opposite corner of the spacer 21. The evacuation system 51 includes a conduit 53 connected in fluid communication between the area of the glass 15 defined by the spacer 21, and the inlet of a pump 54. The fluid introducing system 44 includes a conduit 45 connected in fluid communication with the interior space defined by the spacer 21, and a heater 48. The heater 48 is in the form of a heat exchanger for preheating the optical fluid entering the interior of the spacer 21. A pump 46 has its outlet connected to the inlet of the heater 48, and has its inlet connected to a source of optical fluid (not shown).

The optical spheres such as the optical sphere 36, are introduced to the outer surface of the glass plate 15 within the spacer 21. The spheres are distributed randomly and generally uniformly over the surface of the substrate plate 15, within the boundaries defined by the spacer 21. The spheres are delivered from a sphere source, not shown, where the spheres are fed under pressure, through a delivery tube 42 for application to the substrate surface. The spheres are distributed in a monolayer and are applied at a suitable rate. It will be noted, with reference to FIG. 4, that the spheres are of a spherical configuration at the time of application to the substrate panel 15, and have a diameter slightly greater than the thickness of the resulting chamber.

With the spheres in place, and after insuring that the spheres are in a desired mono layer configuration in a generally uniformly distributed spaced apart manner, the polarizer 23 and the glass plate 19 are aligned with the substrate plate 15 and pressed into position so that the polarizer 23 completely fills the area defined by the spacer 21. As shown in FIG. 5, the seal 17 is formed to bond the panel A, the spacer 21 and the glass plate 15 in a unitary one piece configuration. The seal 17 further seals the chamber 24 in a fluid tight manner. It will be noted with reference to FIG. 5, that after the glass plates have been pressed together, the chamber 24 is formed. Since the chamber has a thickness t which is slightly less than the diameter of the spacer bead 36, the spheres are squeezed or compressed under tension into an ovoid shape, and are held securely within the chamber 24 to prevent their movement when the optical fluid is introduced.

After allowing sufficient time for the elastomeric seal 17 to form a fluid tight bond, the optical gel 37 is delivered to the chamber 24. As indicated above, it is very important that the gel 37 fill the entire chamber and that no air bubbles remain after completion of the filling process. In order to accomplish these objectives, a gel is delivered from a gel source (not shown) to the pump 46. Since the gel 37 is generally of a highly viscous consistency, for certain optical fluids, such as those described in Table 1, it is helpful to heat the gel, utilizing the heater 48 before delivering the gel through the conduit 45 into the chamber 24 to reduce its viscosity.

It is desirable to introduce the gel 37 near a corner of the chamber 24. As the gel is delivered by the gel introduction system 44, the chamber evacuation system 51 is activated.

When the pump 54 is turned on, air is evacuated from the chamber 24 through the conduit 53. In this regard, pump operation should be regulated so that the pressure drop is no more than several inches of water, thereby permitting evacuation of the air from the chamber 24 in a convenient manner. The evacuation of the air from the chamber is accomplished without any dislocation of any of the optical spheres because, as indicated above, the optical spheres are now in the ovoid shape of the spacer bead 38 of FIG. 5. Thus, the spheres are fixed in position for separating and supporting the substrate panels.

The systems 46 and 51 are operated until the chamber 24 is completely filled with the optical gel 37. At this point, the evacuation system 51 and the gel delivery system 44 are turned off and are disconnected from the system. After disconnection, the openings 43 and 57 are plugged with an appropriate suitable elastomeric plug.

Figure 2:
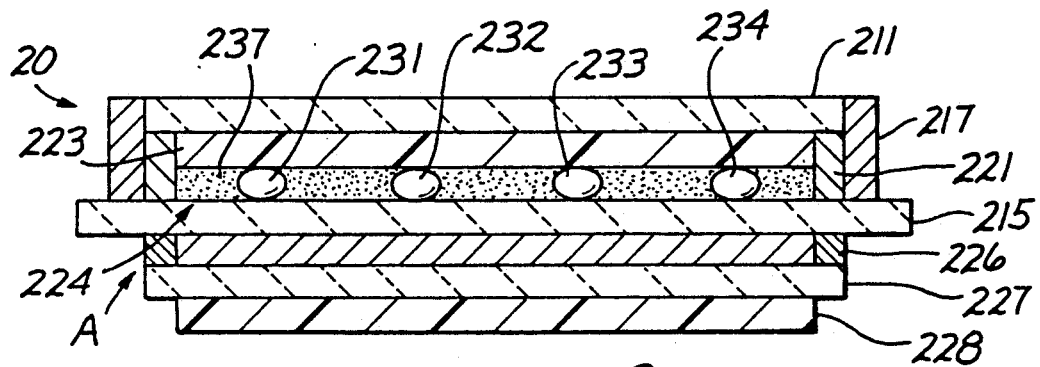
FIG. 2 is a diagrammatic view of a liquid crystal display computer screen construction, according to the present invention.

With reference now to FIG. 2, there is shown a liquid crystal display computer screen construction 20 which is made according to the present invention. The construction 20 is comprised of an LCD panel having glass substrate panels 215 and 227, with a liquid crystal display material 226 disposed therebetween. A polarizer 228 is affixed to the surface of the substrate 227, opposite the liquid crystal material 226. A peripherally disposed spacer 221 separates the substrate panel 215 from a protective glass panel 211. A peripherally disposed elastomeric seal 217 fixes the panel 211 to the panel 215 and provides a fluid tight seal. A polarizer 223, disposed in a manner similar to the polarizer 23 of FIG. 1 is attached to the inner surface of the plate 211. The polarizer 223, spacer 221 and the surface of the glass substrate 215 define a chamber 224. The chamber 224 contains spheres 231, 232, 233 and 234 imbedded in an optical gel 237. The optical gel and the optical spheres are disposed in a manner similar to, and perform a similar function as their respective counterparts of FIG. 1.

In addition to the seal 217, a peripherally disposed seal 222, having a composition similar to that of the seal 217, fixes the substrate 215 to the substrate 227 and confines the liquid crystal material 226.

Figure 3:
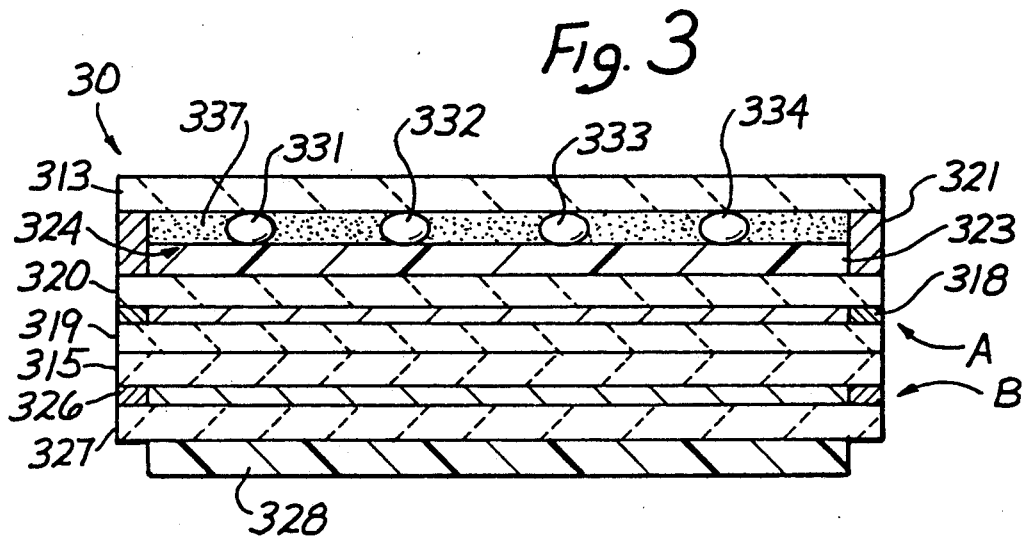
FIG. 3 is a diagrammatic view of a double super twisted liquid nematic display panel computer screen, constructed according to the present invention.

With reference now to FIG. 3 there is depicted a double super twisted liquid nematic display panel computer screen construction 30 which is made according to the present invention. The construction 30 is comprised of a pair of LCD panels A and B. The panel B includes a polarizer 328, a glass substrate panel 327 and a liquid crystal material layer 326 disposed between the substrate 327 and another glass substrate panel 315. The LCD panel A includes a glass substrate panel 319 having one surface in contact with the glass substrate 315. A layer of liquid crystal material 318 is disposed between the substrate 319 and yet another glass substrate 320. A peripherally disposed spacer 321, similar in composition and function to the spacer 21 of FIG. 1, is disposed between the glass substrate 320 and a protective glass plate 313 to form a chamber 324. A polarizer 323 is disposed in the chamber 324 inside the spacer 321. An optical gel material 337 and optical spheres 331, 332, 333 and 334 are disposed within the chamber 324 in a manner similar to, and perform a similar function as their respective counterparts of FIG. 1.

In addition to the seal 317, peripherally disposed 322 and 324, having a composition similar to that of the seal 17 are disposed, respectively, between the substrate 320 and the substrate 319, and the substrates 327 and 317. The seals 322 and 324 fix the respective substrates together and confine, respectively, the liquid crystal material 318 and 326.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of making a liquid crystal display panel construction, comprising:

using a liquid crystal panel means having a layer of liquid crystal materials;

providing a thin, flat sealable chamber means on said panel means extending substantially parallel to said layer of liquid crystal materials;

evacuating said chamber to withdraw air therefrom;

flowing into said chamber means as it is being evacuated an optical fluid having a refractive index substantially equal to refractive index of said panel means, to cause the fluid to flow uniformly over said surface within said chamber means without any substantial bubbles being formed in the fluid; and sealing said chamber means.

2. A method of claim 1, including heating said optical fluid before introducing said fluid into said chamber.

3. A method of claim 1, wherein said heating is accomplished by using a heat exchanger.

4. A method of claim 1, wherein said optical fluid is a fluid selected from the group consisting of UV11-3, UV11-4M1, UV11-5, UV14, UV14-1, UV14-3, UV15-7 and NYOGEL.

5. A method of claim 4, wherein said fluid has a thick, viscous gel consistency.

6. A method of claim 1, wherein said fluid includes a dye.

7. A method of claim 1, including using optical spheres, said spheres having a diameter slightly greater than the thickness of said chamber, compressing said spheres within said chamber to fix them in place prior to evacuating the chamber.

8. A method of claim 7, wherein prior to said compressing, distributing said spheres over said area in a spaced apart manner.

9. A method of claim 7, wherein said compressing includes deforming said spheres into generally ovoid shapes within said chamber means.

10. A method of claim 1, including fixing a polarizer to said panel means.

11. A method of claim 1, including providing means between said panels for defining the thickness of said chamber means.

12. A method of claim 1, including providing chamber air evacuation means;

providing an opening in said chamber means;
connecting in fluid communication said evacuation means with said opening into said chamber means;
subsequently removing said evacuation means; and
sealing said opening.

13. A method of claim 1, further including:
providing a means for introducing said fluid into said chamber;
providing an opening in said chamber means;
connecting in fluid communication said means with said opening into said chamber;
pumping said fluid via said means into said chamber means to fill it with said fluid;
removing said means from said chamber means opening after said chamber has been filled; and
sealing said opening after said means has been removed.

14. A method of claim 1, wherein said fluid is an ordered optical fluid.

15. A method of claim 1, wherein said fluid is a non-ordered optical fluid.

* * * * *